(12) United States Patent
Yokoyama et al.

(10) Patent No.: US 6,974,173 B2
(45) Date of Patent: Dec. 13, 2005

(54) VEHICLE SEAT APPARATUS

(75) Inventors: Takashi Yokoyama, Toyota (JP); Takahiro Ishijima, Nishikamo-gun (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 22 days.

(21) Appl. No.: 10/742,758

(22) Filed: Dec. 23, 2003

(65) Prior Publication Data
US 2004/0183327 A1  Sep. 23, 2004

(30) Foreign Application Priority Data
Dec. 24, 2002  (JP) .............................. 2002-372046

(51) Int. Cl.$^7$ ................................................ B60N 2/10
(52) U.S. Cl. ................................ 296/65.03; 296/65.09; 248/503.1; 297/336
(58) Field of Search .................... 296/65.01, 65.03, 296/65.05, 65.09, 63, 69; 297/331–336, 341.14, 297/341.1, 341.15

(56) References Cited

U.S. PATENT DOCUMENTS

| | | | |
|---|---|---|---|
| 5,238,285 A | 8/1993 | Holdampf et al. | |
| 5,498,051 A | 3/1996 | Sponsier et al. | |
| 5,634,686 A | 6/1997 | Okazaki | |
| 6,065,804 A | 5/2000 | Tanaka et al. | |
| 6,152,515 A * | 11/2000 | Wieclawski | 296/65.03 |
| 6,485,080 B2 * | 11/2002 | Hansen et al. | 296/65.03 |
| 6,698,837 B2 * | 3/2004 | Pejathaya et al. | 297/378.2 |
| 6,820,912 B1 * | 11/2004 | Lavoie | 296/65.03 |
| 6,830,295 B2 * | 12/2004 | Duquesnay et al. | 297/336 |
| 6,863,330 B2 * | 3/2005 | Yokoyama et al. | 296/65.03 |
| 2002/0105203 A1 * | 8/2002 | Hansen et al. | 296/65.03 |
| 2004/0104589 A1 * | 6/2004 | Yokoyama et al. | 296/65.03 |

FOREIGN PATENT DOCUMENTS

| | | |
|---|---|---|
| DE | 198 46 031 C | 1/2002 |
| EP | 0 738 624 A | 10/1996 |
| JP | 08-282352 | 10/1996 |
| JP | 2000-6698 A | 1/2000 |

* cited by examiner

Primary Examiner—Patricia L. Engle
(74) Attorney, Agent, or Firm—Buchanan Ingersoll PC

(57) ABSTRACT

A vehicle seat apparatus includes a first latch mechanism supported at a front portion of a seat cushion frame supporting a vehicle seat, a second latch mechanism supported at a rear portion of the seat cushion frame, a first striker mechanism provided on a vehicle floor and being engagable and disengagable relative to the first latch mechanism, a second striker mechanism provided on the vehicle floor and being engagable and disengagable relative to the second latch mechanism, an upper bracket provided at the first latch mechanism and fixed to the seat cushion frame, and a lower bracket provided at the first latch mechanism and rotatably supported at the upper bracket by a rotating shaft. The upper bracket includes a supporting portion, and the lower bracket moves to be disengaged from the first striker mechanism due to a contact of the supporting portion to the vehicle floor side while the vehicle seat being tumbled is reclined in the rear direction of the vehicle.

5 Claims, 5 Drawing Sheets

VEHICLE SEAT APPARATUS

This application is based on and claims priority under 35 U.S.C. § 119 with respect to Japanese Application No. 2002-372046 filed on Dec. 24, 2002, the entire content of which is incorporated herein by reference.

FIELD OF THE INVENTION

This invention generally relates to a vehicle seat apparatus which can be folded and tumbled forward. More particularly, the present invention pertains to a vehicle seat apparatus allowing the seat to be easily removed from a vehicle floor.

BACKGROUND OF THE INVENTION

It is known that the vehicle seat can be folded and tumbled forward. The vehicle seat being tumbled forward can be removed from the vehicle floor to make available a large space in the vehicle for cargo. The known vehicle seat apparatus disclosed in a U.S. Patent published as No. U.S. Pat. No. 5,498,051 includes a first latch mechanism provided at the front portion of a seat cushion frame and a second latch mechanism provided at the rear portion of the seat cushion frame. The first latch mechanism is engagable and disengagable relative to a first striker mechanism fixed to the floor, and the second latch mechanism is engagable and disengagable relative to a second striker mechanism.

The vehicle seat apparatus is mounted to the vehicle floor as follows. First, a first recess of a lower bracket of the first latch mechanism engages with a first striker of the first striker mechanism, then the seat apparatus is horizontally moved, and finally a second recess of a bracket of the second latch mechanism engages with a second striker of the second striker mechanism. In this configuration, it is difficult to mount the vehicle seat at the vehicle floor in case that the seat is heavy, and the compartment of the vehicle is dark.

The vehicle seat apparatus is removed from the vehicle floor as follows. Firstly, an operating handle is uplifted while the vehicle seat apparatus is tumbled forward, then a hook member of the first latch mechanism is pivotally moved, and the first recess of the lower bracket of the first latch mechanism become being disengagable from the first striker of the first striker mechanism. Then the vehicle seat apparatus being tumbled forward is uplifted in the obliquely upward direction while the first recess of the lower bracket of the first latch mechanism remains being disengagable from a first striker of the first striker mechanism, and the first latch mechanism is completely disengaged from the first striker mechanism, and finally the vehicle seat apparatus is placed on the vehicle floor or carried out of the vehicle.

When the vehicle seat apparatus being tumbled forward is removed, the operating handle need to be uplifted for disengaging (unlocking) the first recess of the lower bracket of the first latch mechanism from the first striker of the first striker mechanism while the vehicle seat apparatus is moved in the obliquely upward direction. Thus, in aforementioned configuration, it is difficult to remove the vehicle seat apparatus from the floor because the two different operations, the handle operation and the seat removing operation, are needed to be done at the same time. In addition, when the first striker is not completely disengaged from the first recess due to that the operation handle in not fully operated, the seat remove operation need to be started again from the beginning. The present invention therefore seeks to provide a vehicle seat apparatus to solve aforementioned problems.

SUMMARY OF THE INVENTION

According to an aspect of the present invention, a vehicle seat apparatus includes a first latch mechanism supported at a front portion of a seat cushion frame supporting a vehicle seat, a second latch mechanism supported at a rear portion of the seat cushion frame, a first striker mechanism provided on a vehicle floor and being engagable and disengagable relative to the first latch mechanism, a second striker mechanism provided on the vehicle floor and being engagable and disengagable relative to the second latch mechanism, an upper bracket provided at the first latch mechanism and fixed to the seat cushion frame, and a lower bracket provided at the first latch mechanism and rotatably supported at the upper bracket by a rotating shaft.

The vehicle seat apparatus further includes the upper bracket including a supporting portion, and the lower bracket moving to be disengaged from the first striker mechanism due to a contact of the supporting portion to the vehicle floor while the vehicle seat being tumbled is reclined in the rear direction of the vehicle.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
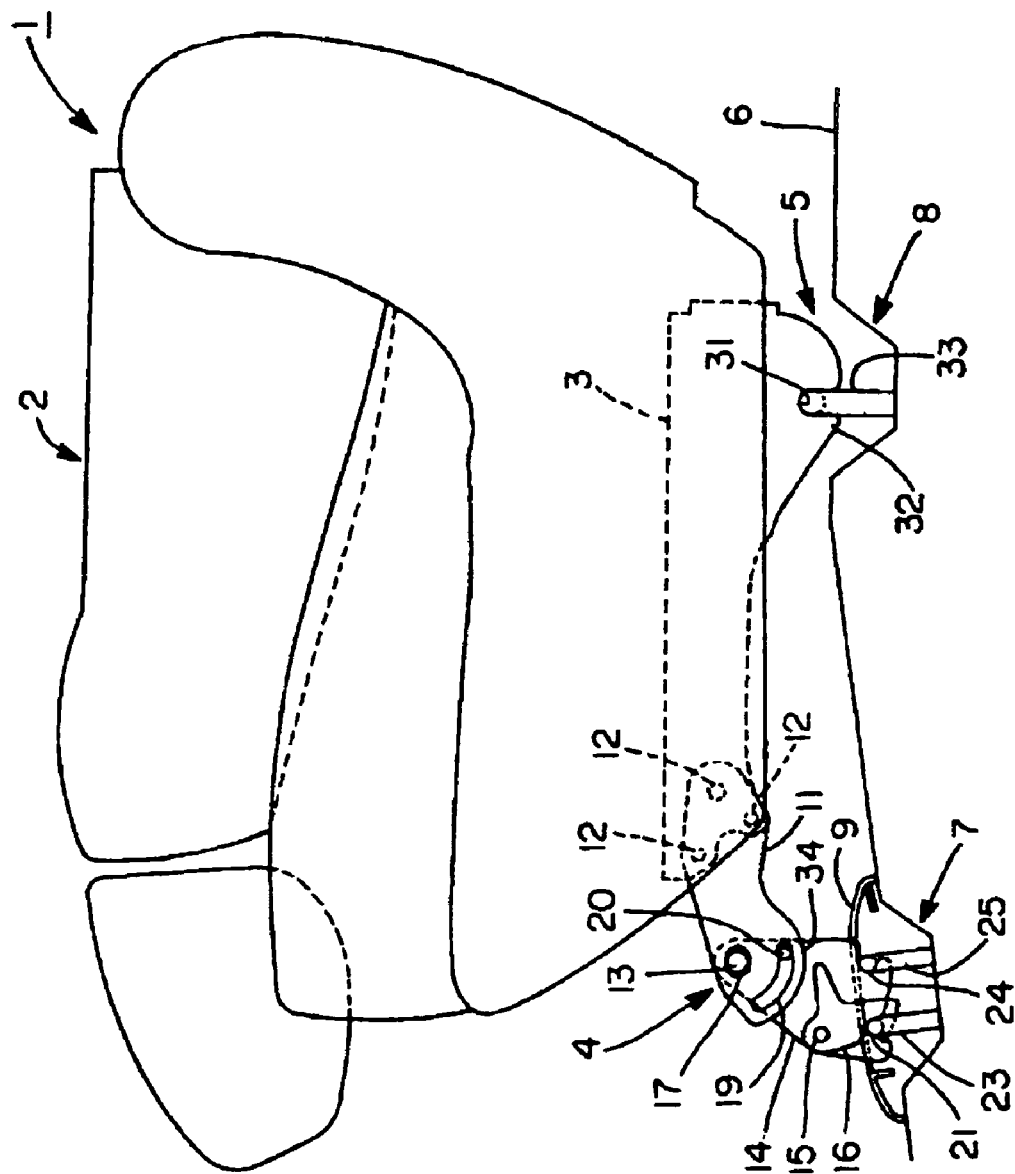
FIG. 1 illustrates a front view of the vehicle seat apparatus mounted to the vehicle floor.

A preferred embodiment of the present invention will be described hereinbelow in detail with reference to the accompanying drawings. According to FIG. 1, a vehicle seat apparatus 1 includes a seat cushion frame 3 supporting a seat 2, a first latch mechanism 4 fixed to a front portion of the seat cushion frame 3, and a second latch mechanism 5 fixed to a rear portion of the seat cushion frame 3. The first latch mechanism 4 is engagable and disengagable relative to a first striker mechanism 7 fixed to a floor 6, and the second latch mechanism 5 is engagable and disengagable relative to a second striker mechanism 8 fixed to the floor 6. The first striker mechanism 7 is covered by a floor bezel 9.

An example of the structure of the first latch mechanism 4 will be explained with reference to FIG. 2. The first latch mechanism 4 includes an upper bracket 11 fixed to the seat cushion frame 3 through a hole 12, a lower bracket 14 pivotally supported to the upper bracket 11 by a shaft 13, and a hook member 16 pivotally attached to the lower bracket 14 by a pin 15. The shaft 13 penetrates through a long hole 17 formed in the upper bracket 11 and a hole formed in the lower bracket 14, and connects to a pipe 18 with a nut 28. The pipe 18 extends in the vehicle width direction and connects the seat cushion frame 3 shown in FIG. 2 to the other seat cushion frame (not shown) provided at opposite side of the vehicle seat in vehicle width direction.

When the seat 2 is supported by the first latch mechanism 4 and the second latch mechanism 5 on the floor 6 as shown in FIG. 1, the long hole 17 extends in longitudinal direction of the vehicle (hereinafter called longitudinal direction of the hole 17). A width of the long hole 17 in vertical direction upon the mounted condition as shown in FIG. 1 (hereinafter called width direction of the hole 17) is approximately the same as the size of the shaft 13 in diameter. Thus, the shaft 13 penetrating through the long hole 17 can move in the longitudinal direction of the long hole 17 while cannot move in vertical direction of the hole 17 upon the mounted condition as shown in FIG. 1. In the upper bracket 11, a cam hole 19 corresponding to the long hole 17 is formed on the opposite side of the hole 12. A pin 20 is fixed uprightly relative to the side surface of the lower bracket 14 through the cam hole 19. When the lower bracket 14 pivotally moves relative to the upper bracket 11, either end of the cam hole 19 in longitudinal direction thereof can be engaged with the pin 20, in other word, the both ends of the cam hole 19 in longitudinal direction thereof can limit a range of the pivotal movement of the pin 20.

Figure 2:
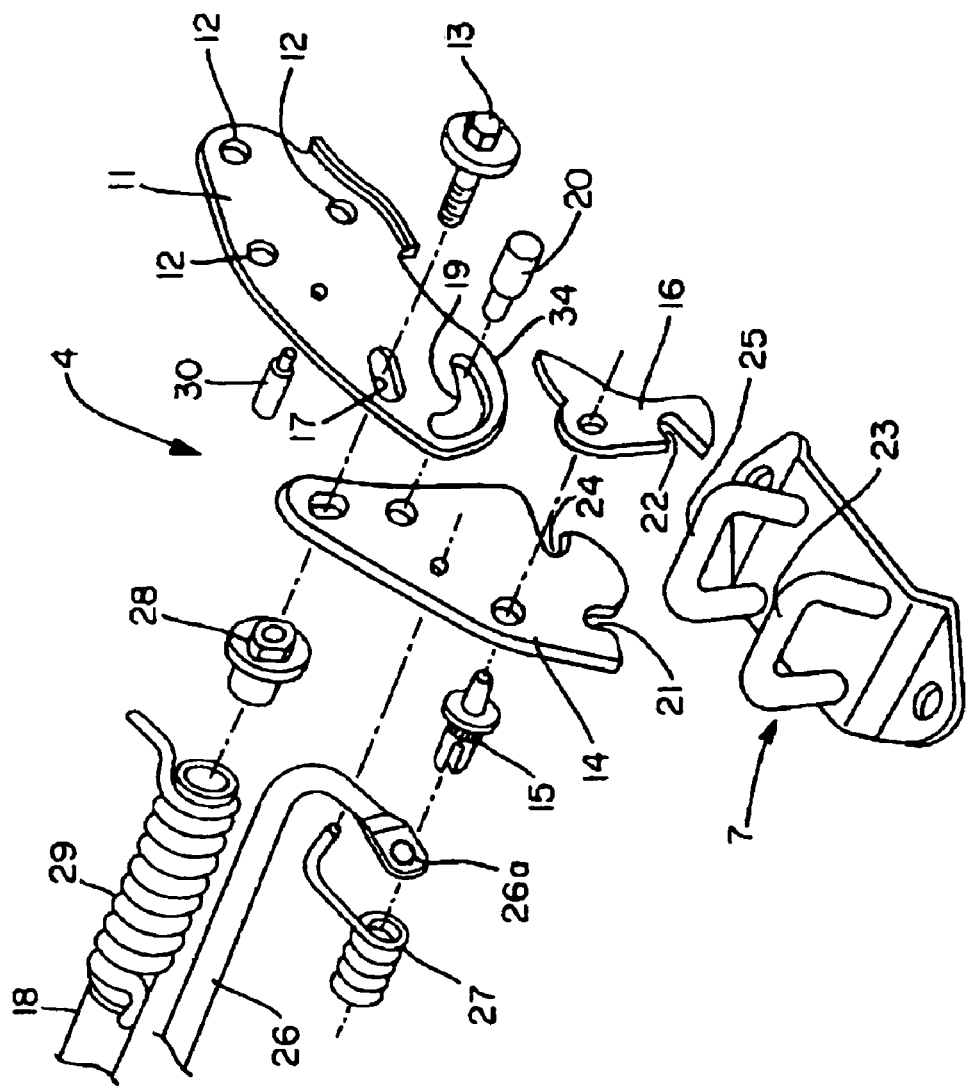
FIG. 2 illustrates an exploded perspective view of a first latch mechanism.

As shown in FIG. 2, the hook member 16 is rotatably fixed relative to the lower bracket 14 by the pin 5 at an area below the pin 20 and above a first recess 21 on the side surface of the lower bracket 14. The hook recess 22 opening toward the front of the vehicle upon the mounted condition as shown in FIG. 1 is formed at the lower portion of the hook member 16 and engaged with a horizontal portion of the first striker 23 for keeping an engaging condition between the first striker 23 and the first recess 21 of the lower bracket 14.

In addition to the first recess 21 opening in the downward direction upon the mounted condition as shown in FIG. 2, the lower bracket 14 also includes a second recess 24 opening in the rear direction of the vehicle and provided approximately in a line with the first recess 21 in the longitudinal direction of the vehicle. The second recess 24 is engagable with a second striker 25 of the first striker mechanism 7.

A coil spring 27 is provided to the pin 15 for applying a biasing force to the hook member 16 to rotate in the direction in which the hook member 16 engages with the first striker 23. The coil spring 27 engages at one end thereof with an engaging recess formed at the pin 15 and engaged at the other end thereof with a hole at the lower bracket 14. The pin 15 includes plural recesses extending in the longitudinal direction thereof at the peripheral surface thereof, and an operating lever 26 is fixed through a hole 26a to the recesses of the pin 15.

The other end of the operating lever 26 is fixed to a pin (not shown) of a first lock mechanism (not shown) on the opposite side of the vehicle seat. Thus, the hook member 16 is disengaged from the first striker 23 when the operating lever 26 is pulled in the upward direction against the biasing force applied to the hook member 16 by the coil spring 27.

The nut 28 is inserted into the pipe 18 extending horizontally in the vehicle width direction for connecting the two upper brackets 11 provided on the both sides of the vehicle seat. One end of a coil-type flip-up spring 29 flipped upwardly is engaged with an engaging portion on an outer peripheral side surface of the pipe 18. The other end of flip-up spring 29 is engaged with the pin 30 fixed uprightly relative to the upper bracket 11. The flip-up spring 29 applies a biasing force to the upper bracket 11 for rotating in anticlockwise direction in FIG. 1 and being tumbled forward. In addition, the seat 2 is supported by the flip-up spring 29 when being tumbled forward, so that the seat 2 can be easily tumbled forward or easily restored in the folded condition.

The second latch mechanism 5 includes a bracket portion 32 projecting in downward direction at the rear portion of the seat cushion frame 3 and including a third recess 31 being engagable with a third striker 33 at the rear portion of the seat cushion frame 3.

The second latch mechanism 5 having a known lock mechanism which is applied to a door lock apparatus of the vehicle includes a latch and a pawl being engagable with the latch (not shown). The latch is engaged with the third striker 33 while the pawl stops the rotation of the latch. When a cable connected to the pawl is pulled by an operating means, the pawl is disengaged from the latch; as a result, the latch disengages from the third striker 33. The cable can be operated in conjunction with the folding operation of the seat back. When the lock mechanism is disengaged, the seat 2 can be rotated forwardly and tumbled relative to the shaft 13 of the first lock mechanism.

The floor bezel 9 made of resin covers a depressed portion on the floor 6 at which the first striker 23 and the second striker 24 is provided. The floor bezel 9 includes an opening portion for exposing the center portion of the horizontal portion of the striker 23 and the striker 25.

A supporting portion 34 formed at the peripheral surface of the upper bracket 11 facing to the vehicle floor 6 is a rounded arc form along the cam hole 19. While the vehicle seat apparatus 1 is tilted in the rear direction of the vehicle, in other word, moved from being in a condition shown in FIG. 3 to being in a condition shown in FIG. 5, the supporting portion 34 contacts with the floor carpet. Thus, the vehicle seat 1 is pivotally moved in the clockwise direction relative to the supporting portion 34, and the lower bracket 14 remains being lifted with leverage via the supporting portion 34. As a result, the lower bracket 14 moves away from the second striker 25, and the second recess 24 is disengaged from the second striker 25.

In other word, a center point of the pivotal movement for reclining the vehicle seat apparatus in the rear direction of the vehicle has been changed from a engaging point at which the second recess 24 engages with the second striker 25 to a contacting point at which the supporting portion 34 contacts with the floor carpet, so that the lower bracket 14 is pivotally moved in the clockwise direction relative to the contacting point. In this way, the second recess 24 is automatically disengaged from the second striker 25 by reclining the vehicle seat 1 in the rear direction of the vehicle.

Figure 3:
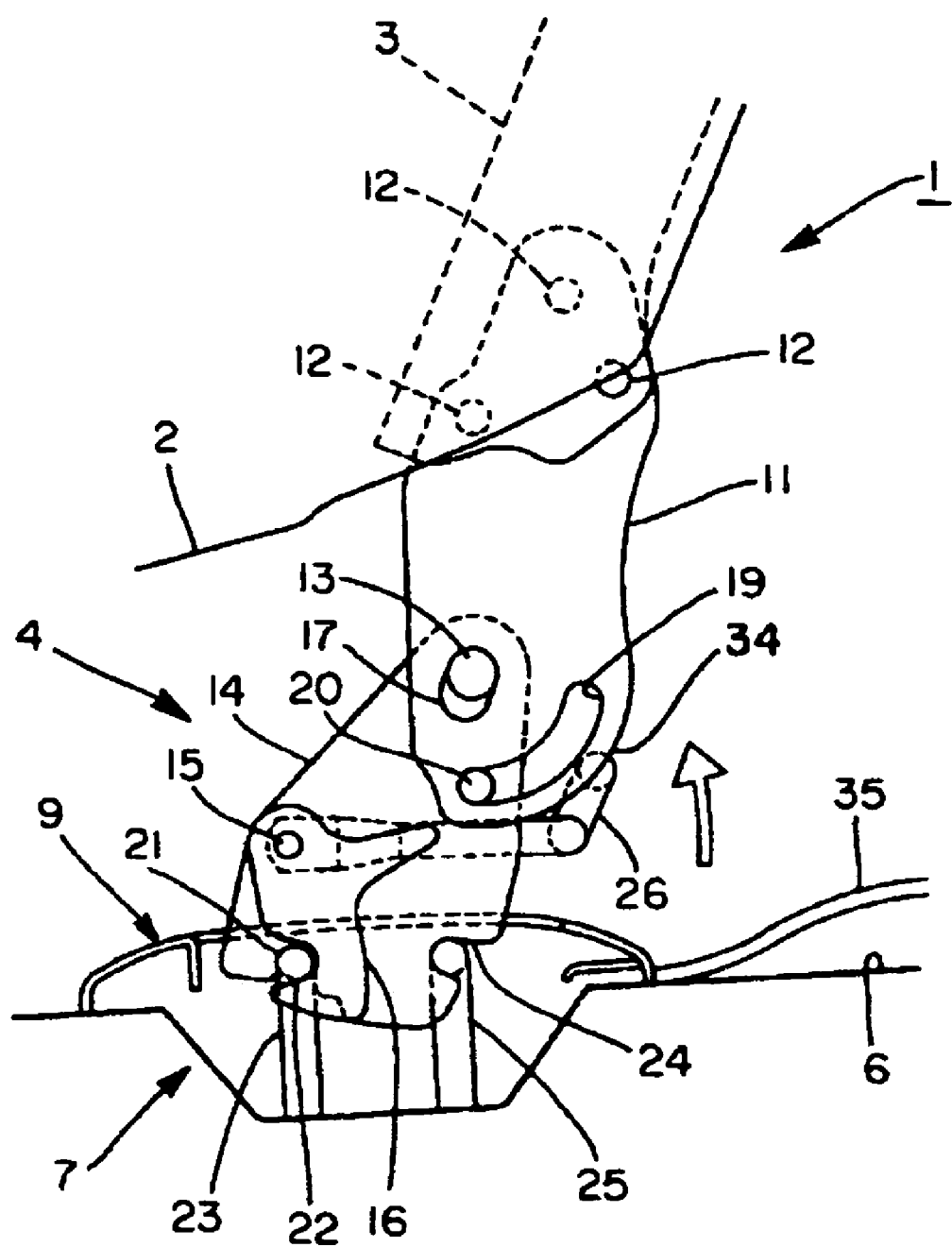
FIG. 3 illustrates a partial front view of the vehicle seat apparatus being tumbled forward.

A removing process of the vehicle seat apparatus 1 having aforementioned configuration from the floor 6 will be explained relative to FIG. 3 through FIG. 5. The lock mechanism (not shown) is operated by reclining the seat back of the vehicle seat apparatus 1, so that the second latch mechanism 5 is disengaged (unlocked) from the second striker mechanism 8. Then, the vehicle seat apparatus 1 is up-tilted in forward direction and tumbled forward as shown in FIG. 3. Then, The hook member 16 is disengaged from the first striker 23 by pulling the operating lever 26 in upward direction.

Figure 4:
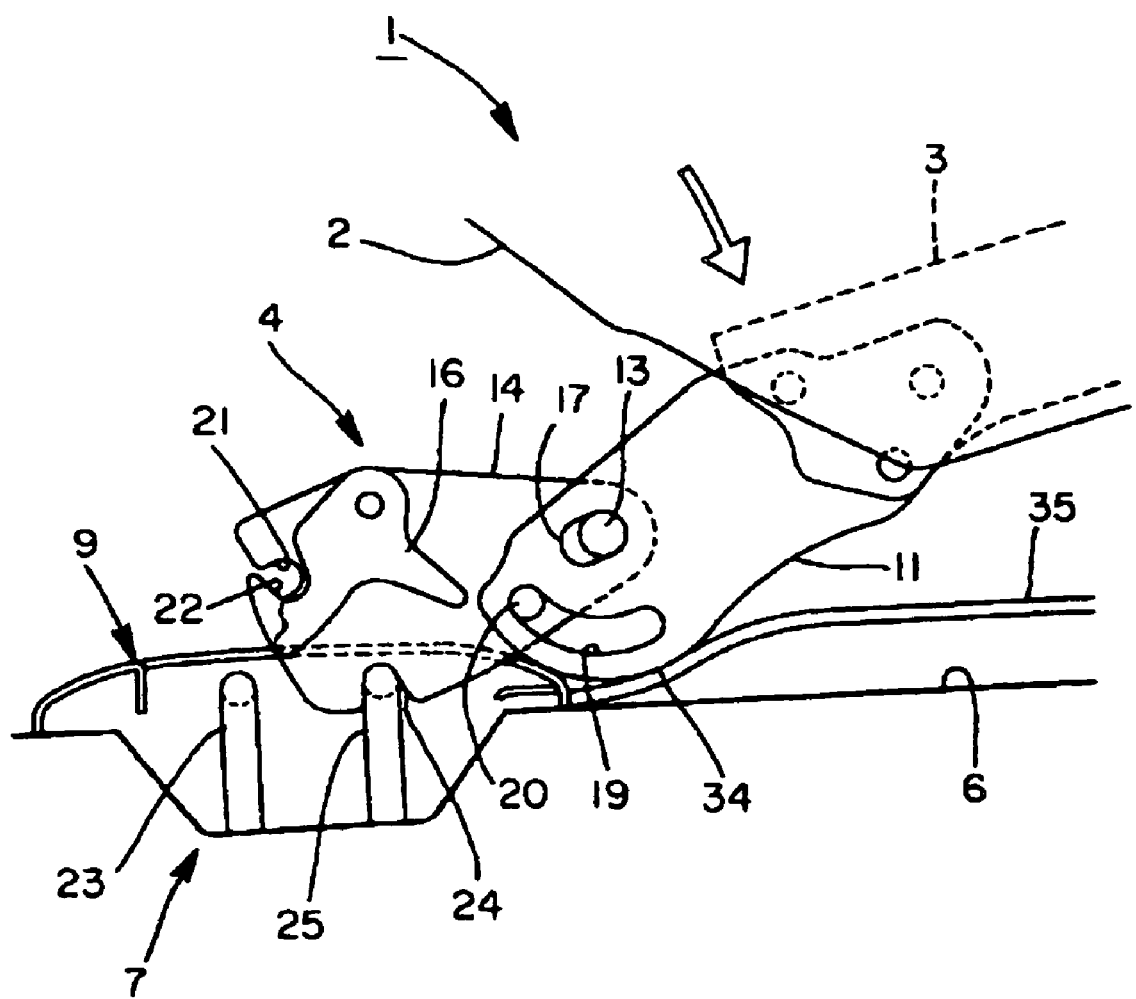
FIG. 4 illustrates a partial front view of a condition in which a supporting point of a lower bracket is engaged with a floor carpet.
Figure 5:
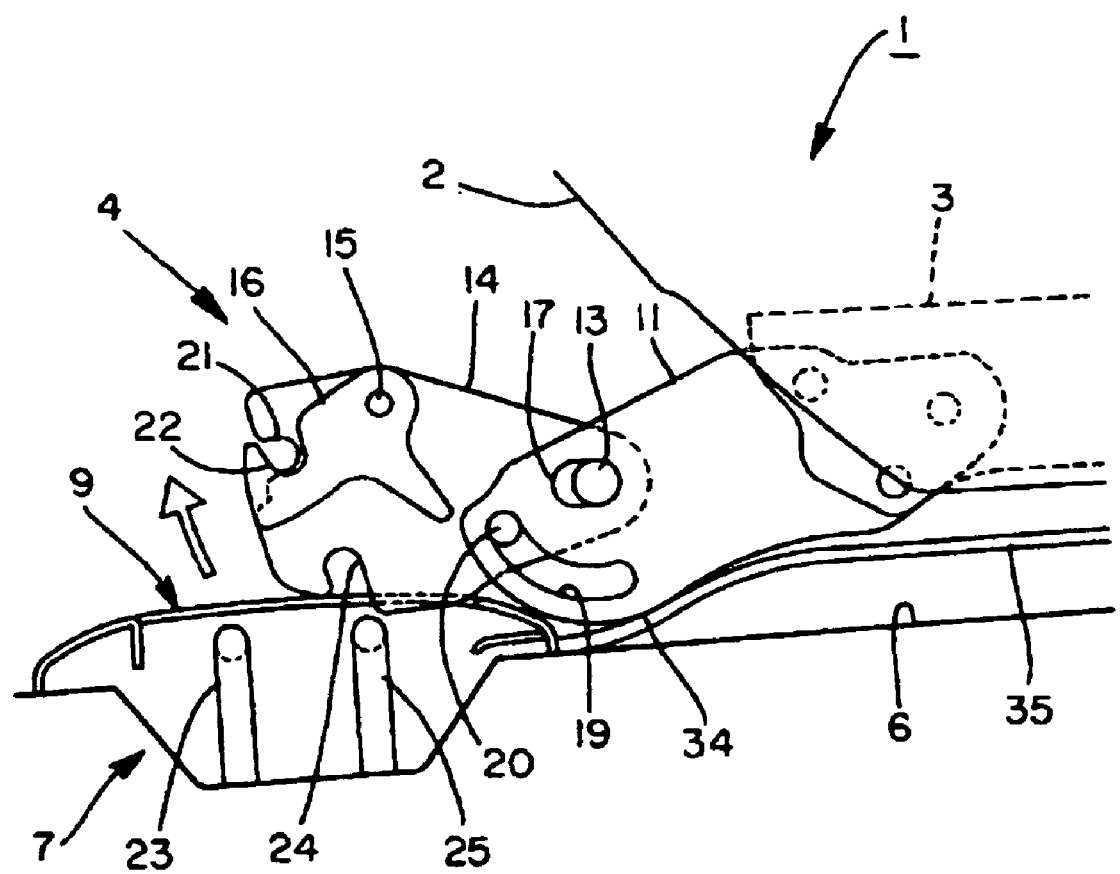
FIG. 5 illustrates a partial front view of a condition in which the lower bracket is disengaged from a striker.

As shown in FIG. 4, the vehicle seat 2 is reclined in the rear direction of the vehicle relative to the engaging point between the second recess 24 and the second striker 25. While the vehicle seat apparatus 1 is reclined in the rear direction of the vehicle, the supporting portion 34 contacts with the surface of the floor carpet 35. At this point, the first recess 21 is disengaged from the first striker 23. Engaging the supporting portion 34 with the floor carpet 35, the vehicle seat apparatus 1 can pivotally move relative to the contacting point at which the supporting portion 34 contacts to the floor carpet 35 while the vehicle seat apparatus 1 is further reclined in the rear direction of the vehicle. Then the lower bracket 14 pivotally moves in the clockwise direction with leverage relative to the contacting point, as a result, the second recess 24 is automatically and completely disengaged from the second striker 25 (shown in FIG. 5). Then, the vehicle seat apparatus 1 being in a condition shown in FIG. 5 can be removable from the vehicle floor 6.

According to the current invention, the supporting portion contacting to the vehicle floor is provided at the lower bracket, so that the seat apparatus to be removed from the vehicle floor by just reclining the tumbled vehicle seat apparatus in the rear direction of the vehicle. In this configuration, the vehicle seat apparatus can be easily removed in a simple way without being uplifted.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A method of operating a vehicle seat apparatus that comprises: a first latch mechanism supported at a front portion of a seat cushion frame supporting a vehicle seat; the first latch mechanism comprising an upper bracket fixed to the seat cushion frame and possessing a supporting portion, and a lower bracket rotatably supported at the upper bracket; a second latch mechanism supported at a rear portion of the seat cushion frame; a first striker mechanism provided on a vehicle floor side and engagable and disengagable relative to the first latch mechanism; and a second striker mechanism provided on the vehicle floor side and engagable and disengagable relative to the second latch mechanism; the method comprising:

releasing engagement between the second latch mechanism and the second striker mechanism;

tumbling the vehicle seat in a forward direction;

thereafter reclining the vehicle seat in a rearward direction to cause the supporting portion of the upper bracket to contact the vehicle floor side to facilitate disengagement of the lower bracket from the first striker mechanism.

2. A method of operating a vehicle seat apparatus according to claim 1, wherein the lower bracket is rotatably supported at the upper bracket by a shaft, the upper bracket rotating relative to the lower bracket about the shaft when the vehicle seat is tumbled in the forward direction.

3. A method of operating a vehicle seat apparatus according to claim 1, wherein the lower bracket comprises first and second recesses, and the first striker mechanism comprises first and second strikers, the first recess engaging the first striker and the second recess engaging the second striker before releasing the engagement between the second latch mechanism and the second striker mechanism, the first latch mechanism also comprising a hook member which engages the first striker, the hook member being released from engagement with the first striker after the vehicle seat is tumbled in the forward direction.

4. A method of operating a vehicle seat apparatus according to claim 1, wherein the lower bracket comprises at least one recess, and the first striker mechanism comprises at least one striker, the at least one recess engaging the at least one striker before releasing the engagement between the second latch mechanism and the second striker mechanism, wherein as the vehicle seat is reclined in the rearward direction a pivot about which the vehicle seat rotates shifts from an engaging point at which the at least one striker engages the at least one recess to a contact point at which the supporting portion of the upper bracket contacts the vehicle floor side.

5. A method of operating a vehicle seat apparatus according to claim 1, wherein the lower bracket rotates about a contact point at which the supporting portion contacts the vehicle floor side while the vehicle seat is reclined in the rearward direction.

* * * * *